(12) United States Patent
Park et al.

(10) Patent No.: US 8,749,774 B2
(45) Date of Patent: Jun. 10, 2014

(54) INTEGRATING SPHERE PHOTOMETER AND MEASURING METHOD OF THE SAME

(75) Inventors: Seongchong Park, Daejeon (KR); Dong Hoon Lee, Daejeon (KR); Seung Nam Park, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 13/806,780

(22) PCT Filed: Jul. 18, 2011

(86) PCT No.: PCT/KR2011/005257
§ 371 (c)(1),
(2), (4) Date: Dec. 23, 2012

(87) PCT Pub. No.: WO2012/018182
PCT Pub. Date: Feb. 9, 2012

(65) Prior Publication Data
US 2013/0099102 A1    Apr. 25, 2013

(30) Foreign Application Priority Data
Aug. 2, 2010  (KR) ........................ 10-2010-0074708

(51) Int. Cl.
*G01J 1/04* (2006.01)
*G01J 1/42* (2006.01)
*G01J 3/02* (2006.01)

(52) U.S. Cl.
CPC .... *G01J 1/04* (2013.01); *G01J 1/42* (2013.01); *G01J 3/0251* (2013.01); *G01J 3/0254* (2013.01)

USPC ......... 356/236; 356/319; 356/326; 250/208.2

(58) Field of Classification Search
CPC ............ G01J 1/04; G01J 1/42; G01J 3/0251; G01J 3/0254
USPC ................ 356/236, 319; 250/226, 228, 208.2
See application file for complete search history.

(56) References Cited

U.S. PATENT DOCUMENTS 4,645,922 A * 2/1987 Welbourn et al. ............. 250/226
4,842,404 A * 6/1989 Duda ............................ 356/218

(Continued)

FOREIGN PATENT DOCUMENTS

JP    2002-062189 A    2/2002
JP    2002-318156 A    10/2002

(Continued)

*Primary Examiner* — Sang Nguyen
(74) *Attorney, Agent, or Firm* — Revolution IP, PLLC

(57) ABSTRACT

Provided are an integrating sphere photometer and a measuring method of the same. The integrating sphere photometer includes a plurality of photodetectors, an integrating sphere having through-holes formed to correspond to the photodetectors, baffles disposed inside the integrating sphere in front of the photodetectors to be spaced apart from the photodetectors, a photometer disposed at a through-hole, and an adjustment unit adjusting output signals of the photodetectors to have the same output signal with respect to light illuminated from a point-like standard light source disposed at a center region in the integrating sphere.

17 Claims, 9 Drawing Sheets

(56) References Cited

U.S. PATENT DOCUMENTS

| | | | | |
|---|---|---|---|---|
| 4,932,779 A | * | 6/1990 | Keane | 356/319 |
| 5,359,406 A | * | 10/1994 | Suzuki | 356/236 |
| 5,596,414 A | * | 1/1997 | Tyler | 356/417 |
| 5,748,304 A | * | 5/1998 | Heinonen | 356/236 |
| 5,818,578 A | * | 10/1998 | Inman et al. | 356/246 |
| 5,963,335 A | * | 10/1999 | Boutelle | 356/433 |
| 6,721,048 B2 | * | 4/2004 | Yokota et al. | 356/319 |
| 7,508,503 B2 | * | 3/2009 | Jang | 356/236 |
| 2005/0134853 A1 | * | 6/2005 | Ingleson et al. | 356/402 |
| 2009/0051910 A1 | * | 2/2009 | Imura | 356/243.8 |
| 2012/0320371 A1 | * | 12/2012 | Park et al. | 356/236 |

FOREIGN PATENT DOCUMENTS

| | | |
|---|---|---|
| JP | 2003-214945 A | 7/2003 |
| KR | 20-0304586 Y | 2/2003 |
| KR | 10-0970244 B | 7/2010 |

\* cited by examiner

INTEGRATING SPHERE PHOTOMETER AND MEASURING METHOD OF THE SAME

CROSS REFERENCE TO PRIOR APPLICATIONS

This application is a National Stage Application of PCT International Patent Application No. PCT/KR2011/005257, filed on Jul. 18, 2011, under 35 U.S.C. §371, which claims priority to Korean Patent Application No. 10-2010-0074708, filed on Aug. 2, 2010, which are all hereby incorporated by reference in their entirety.

TECHNICAL FIELD

The present invention relates to an integrating sphere photometer for measuring a total luminous flux (unit: lm) which is one of the optical characteristics of light emitting devices. More specifically, the present invention is directed to an integrating sphere photometer capable of omitting correction procedure of an error caused by a difference in spatial distribution of illumination output between a light source to be measured and a standard light source, through spatial averaging using a photometer and a plurality of photodetectors during measurement by comparison of the standard light source and the light source to be measured therein.

BACKGROUND ART

Total luminous flux of a light source means the sum of the luminous flux (unit: lm) that the light source emits for all directions. Luminous efficiency (unit: lm/W) of a light source is determined as a ratio of total luminous flux (unit: lm), which quantifies an optical output, to an input electrical power (unit: W). Therefore, accurate measurement of the total luminous flux is extremely important in evaluating the performance of lighting equipments.

Conventionally, the total luminous flux is measured by means of a goniophotometer. After spatial distribution of an output luminous flux is measured at each angle, the total luminous flux may be obtained by mathematically integrating the measured angular distribution of output luminous flux.

As another method, the total luminous flux may be obtained by comparing a standard light source whose total luminous flux is already known and a light source to be measured using an integrating sphere photometer. In principle, an integrating sphere photometer gives an output signal that is proportional to luminous flux enclosed in an integrating sphere. A standard light source whose total luminous flux is known and a light source to be measured are sequentially put into the integrating sphere photometer to be turned on. From the proportional relationship, output signals of the standard light source and the light source to be measured are measured and compared with each other to measure a total luminous flux. An integrating sphere photometer is advantageous in simpler instrumental configuration and shorter measurement time than a goniophotometer. When a standard light source and a light source to be measured are identical in type, the integrating sphere photometer may easily obtain the total luminous flux of high accuracy through simple comparison and measurement. Due to these advantages, the integrating sphere photometer is being widely used in practical fields.

However, when a standard light source and a light source to be measured are different in shape, output spectral distribution, and output spatial distribution, the integrating sphere photometer must be subjected to a correction procedure to achieve an accurate measurement. The correction procedure may include self-absorption mismatch correction, spectral mismatch correction, and spatial mismatch correction. While the absorption correction and the spectral mismatch correction may be performed without difficulty, the spatial mismatch correction is relatively complicated since it needs to measure not only a luminous intensity distribution at each angle of a light source to be measured but also a spatial response distribution function (SRDF) of the integrating sphere photometer. In particular, it is extremely hard to measure the SRDF of the integrating sphere photometer. Therefore, it is substantially hard to accurately measure a total luminous flux of a directional light source having large spatial mismatch.

Accurate spatial mismatch correction is required to undergo a more complicated procedure than a total luminous flux absolute measuring method using a goniophotometer. For this reason, in an integrating sphere device for use in an industrial field of which purpose is not to maintain a primary standard like the national metrology institute, a spatial response error is generally minimized using a standard light source having the same spatial distribution of illumination output as a light source to be measured. However, most of total luminous flux standard lamps emit light in form of a point light source. Moreover, if a light source to be measured is changed, another suitable standard lamp must be prepared for each light source to be measured.

DISCLOSURE OF INVENTION

Technical Problem

Embodiments of the present invention provide an integrating sphere photometer capable of removing an error caused by spatial mismatch which occurs when total luminous flux of a various directional light source is measured.

Embodiments of the present invention also provide a measuring method of an integrating sphere photometer capable of removing an error caused by spatial mismatch which occurs when total luminous flux of a various directional light source is measured.

Solution to Problem

According to one embodiment of the present invention, the integrating sphere photometer may include a plurality of photodetectors; an integrating sphere having through-holes formed to correspond to the photodetectors; baffles disposed inside the integrating sphere in front of the photodetectors to be spaced apart from the photodetectors; a photometer disposed at a through-hole; and an adjustment unit adjusting output signals of the photodetectors to have the same output signal with respect to light illuminated from a point-like standard light source disposed at a center region in the integrating sphere.

According to another embodiment of the present invention, the measuring method may include a matching step in which baffles are disposed in front of through-holes in an integrating sphere having the through-holes and a point-like standard light source is mounted at the center of the integrating sphere and turned on to match outputs of photodetectors disposed to correspond to the through-holes; and a measuring step in which outputs of photodetectors and an output of a photometer are measured in a light source to be measured and the standard light source.

Advantageous Effects of Invention

According to an integrating sphere photometer described above, spatial response of an integrating sphere is made uniform by a plurality of photodetectors that are symmetrically disposed on a surface of the integrating sphere. In addition, gains of the photodetectors disposed on the surface of the integrating sphere are adjusted to provide the same output signal when a point-like standard light source is turned on. Spatial mismatch correction is done using a plurality of low-cost photodetectors. Thus, although a typical standard light source of point light source type is used, a spatial mismatch error is efficiently removed even when a directional light source is measured.

MODE FOR THE INVENTION

Figure 1:
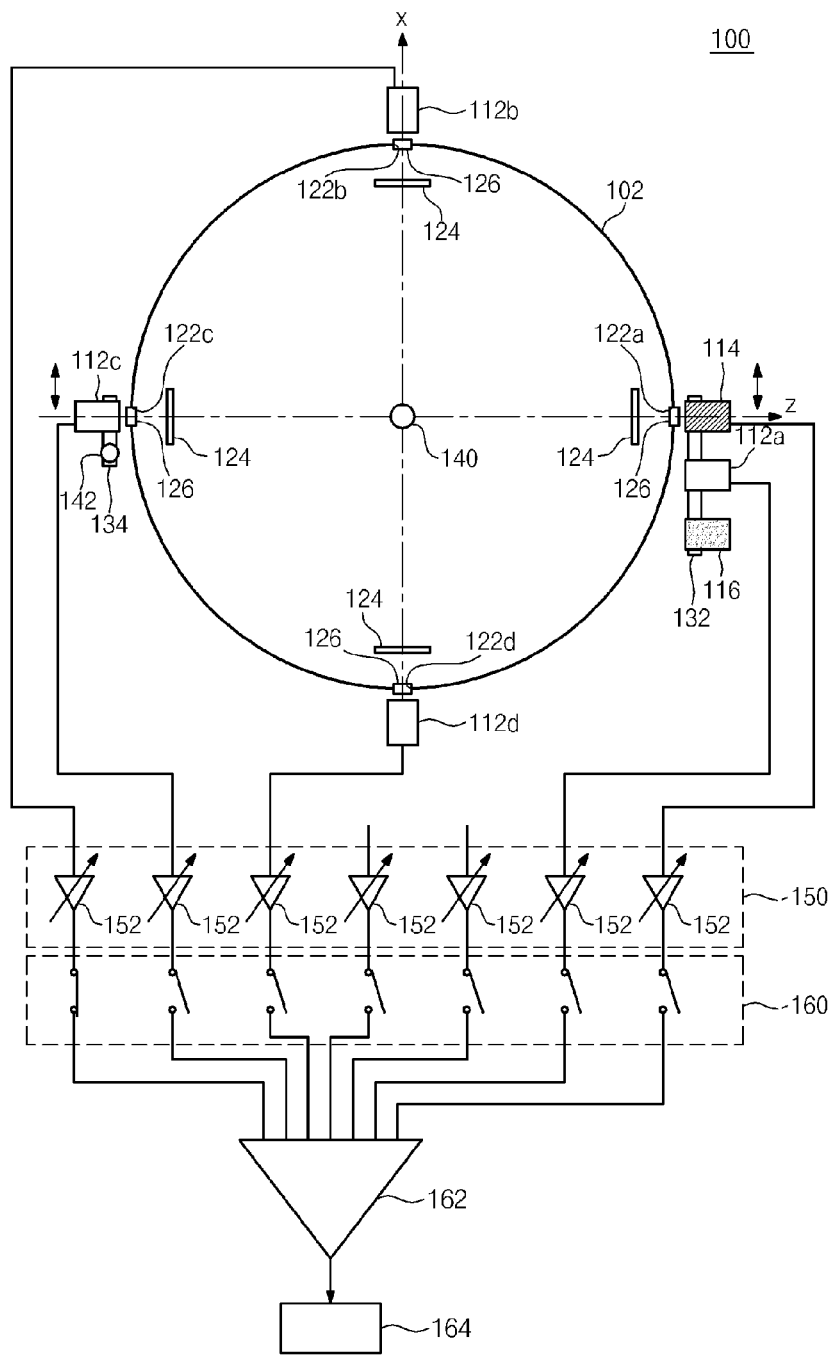
FIG. 1 illustrates an integrating sphere photometer according to one embodiment of the present invention.

There is a demand for an integrating sphere photometer which is capable of measuring a total luminous flux of a directional light source while not being different in function from a conventional integrating sphere photometer using a standard light source. It is necessary for the integrating sphere photometer to remove an error caused by spatial mismatch between a standard light source and a light source to be measured.

An integrating sphere photometer according to one embodiment of the present invention performs main measurement using a high-cost photometer while performing spatial mismatch correction using low-cost photodetectors. Further, the integrating sphere photometer may perform self-absorption mismatch correction using an auxiliary light source and a photometer and perform spectral mismatch correction using a spectroradiometer. Without separately forming a through-hole at which a photometer or a spectroradiometer is mounted, a photometer or a spectroradiometer is mounted at a photodetector-mounted through-hole after removing the photodetector at the photodetector-mounted through-hole. Thus, the integrating sphere photometer according to the present invention may accurately measure a total luminous flux using a plurality of photodetectors and one photometer.

The present invention will now be described more fully hereinafter with reference to the accompanying drawings, in which preferred embodiments of the present invention are shown. However, the present invention may be embodied in many different forms and should not be construed as limited to the embodiments set forth herein. Rather, these embodiments are provided so that this disclosure will be thorough and complete, and will fully convey the scope of the present invention to those skilled in the art. In the drawings, elements are exaggerated for clarity. Like numbers refer to like elements throughout.

Figure 2:
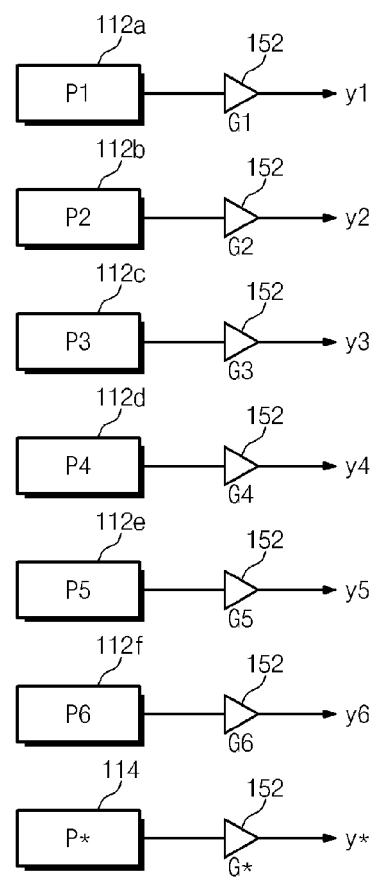
FIG. 2 illustrates an adjustment unit in FIG. 1.

Referring to FIGS. 1 and 2, the integrating sphere photometer includes a plurality of photodetectors $112a\sim112f$ (of which $112e$ and $112f$ are not shown in FIG. 1), an integrating sphere 102 having through-holes $122a\sim122f$ (of which $122e$ and $122f$ are not shown in FIG. 1) formed to respectively correspond to the photodetectors $112a\sim112f$, baffles 124 disposed inside the integrating sphere 102 to be spaced apart from the photodetectors $112a\sim112f$ in front of the photodetectors $112a\sim112f$, a photometer 114 disposed at the through-hole $122a$, and an adjustment unit 150 adjusting output signal gains of the photodetectors $112a\sim112f$ to have the same output signal with respect to a light illuminated from a standard light source 140 of point light source type disposed at a central region inside the integrating sphere 102. The adjustment unit 150 may also adjust an output signal gain of the photometer 114.

The integrating sphere 102 may have a diameter ranging from tens of centimeters to several meters. A reflectivity R of an inner circumferential surface of the integrating sphere 102 may be 90 percent or higher. The inner circumferential surface of the integrating sphere 102 may be substantially spherical. The inner circumferential surface of the integrating sphere may comprise a plurality of removable parts. The inner circumferential surface of the integrating sphere 102 may be diffuse reflective.

The through-holes $122a\sim122f$ may be formed on a surface of the integrating sphere 102 to be symmetrical with respect to the center of the integrating sphere 102. Assuming that the center of the integrating sphere 102 is the origin of a coordinate and a radius of the integrating sphere 102 is given as L, the through-holes $122a\sim122f$ may be arranged on (L, 0, 0), (−L, 0, 0), (0, L, 0), (0, −L, 0), (0, 0, L), and (0, 0, −L) in a Cartesian coordinate system. The through-holes $122e$ and $122f$, the baffles, and the photodetectors $112e$ and $112f$, which are arranged on the y-axis, are not shown in FIG. 1. The through-holes may constitute a pair of through-holes which are symmetrical with respect to the integrating sphere 102.

Optical diffusers 126 may be disposed to be inserted into the through-holes $122a\sim122f$ or spaced apart therefrom. Light inside the integrating sphere 102 may be transmitted to the through-holes $122a\sim122f$ diffusively via the optical diffusers 126. Each of the optical diffusers 126 may be made of opal glass, ground glass, Teflon or engineering glass.

The baffle 124 may be disposed inside the integrating sphere 102 to be spaced apart from the photodetectors $122a\sim122f$. Assuming that the center of the integrating sphere 102 is the origin of a circle and a radius of the integrating sphere 102 is given as L, the baffle 124 may be disposed at six positions adjacent to (L−d, 0, 0), (−L+d, 0, 0), (0, L−d, j), (0, −L+d, 0), (0, 0, L−d), and (0, 0, −L+d) in the Cartesian coordinate system. The central axis of the baffle 124 may match that of the through-hole and the photodetector.

The baffles 124 may prevent light radiated from the light source to be measured (146) or the standard light source 140 from directly impinging on the photodetectors $112a\sim112f$. The baffle 124 may be a circular plate or a polygonal plate. A reflectivity of the baffle 124 may be 90 percent or higher. A diameter of the baffle 124 may be greater than that of the photodetector $112a$, that of the through-hole $122a$ or that of the standard light source 140.

The photodetectors $112a\sim112f$ are disposed around the through-holes $122a\sim122f$. More specifically, the photodetectors $112a\sim112f$ may be disposed at the back of the through-holes $122a\sim122f$. Each of the photodetectors $112a\sim112f$ may be made of a silicon (Si) based material or an indium gallium arsenide (InGaAs) based material. Distances between the photodetectors $112a\sim112f$ and the through-holes $122a\sim122f$ may be adjusted, which may allow an output signal gain of the photodetector to be adjusted.

The photodetector $112a$ and the photometer 114 provide an output signal to which the intensity of radiation is in proportion, based on the principle that an electrical signal is generated when photons reach the photodetector 112a or the photometer 114. The photometer 114 may include an optical filter to make it have the spectral responsivity of CIE 1924 V(λ) function, established by the International Commission on Illumination (CIE), which corresponds to the spectral responsivity of human eye. The photometer 114 may be disposed at a new through-hole (not shown) formed around the first through-hole 122a or at the back of the first through-hole 122a.

When the standard light source 140 of point light source type is mounted at a center region of the integrating sphere 102 and is turned on, the adjustment unit 150 may be means for adjusting output signals of the photodetectors 112a~112f to match each other. For example, the adjustment unit 150 may include preamplifiers 152 configured to amplify output signals of the photometers 112a~112f. The preamplifiers 152 may adjust gains G1~G6 to output signals of the same intensity while the standard light source 140 of point light source type is turned on.

A light source to be measured (146) may be a directional light source. For example, the light source to be measured may be an incandescent lamp, a fluorescent lamp, a light emitting diode (LED), a liquid crystal display (LCD), an organic light emitting diode (organic EL) or the like. The light source to be measured may be a directional light source using a reflection cup or a lens. The directional standard light source may be required to be subjected to spatial mismatch correction.

In case of a directional light source, a response signal of an integrating sphere photometer varies with the orientation of the light source to be measured. Thus, a measured value varies with the orientation of the light source to be measured. In the integrating sphere photometer, photometer or photodetectors are disposed at a plurality of positions to obtain an effect that the sum of outputs of the photodetectors averages a spatial response distribution function. Accordingly, the spatial mismatch correction may be carried out.

The adjustment unit 150 may adjust output signals of the photodetectors to have the same output signal with respect to light illuminated from the standard light source of point light source type disposed at the center region in the integrating sphere. The adjustment unit 150 may measure output signals of the photodetectors and the photometer and convert the output signals to digital signals to adjust the digital signals using a hardware or a software. For example, adjusting means through the hardware may use preamplifiers capable of adjusting a gain.

The adjustment unit 150 may include preamplifiers 152 configured to amplify outputs of the photodetectors 112a~112f and an output of the photometer 114. The photodetectors 112a~112f are mounted at through-holes of the integrating sphere 102, respectively. The standard light source 140 of point light source type is mounted at the center of the integrating sphere 102 and is turned on. Thereafter, gains of the preamplifiers 152 is adjusted such that outputs y1~y6 of the photodetectors 112a~112f match each other.

Switches 160 may be disposed between the preamplifiers 152 and a summing unit 162. The switches 160 may selectively connect the summing unit 162 to the preamplifiers 152. The switches 160 may electrically connect the preamplifiers 152 to the summing unit 162 simultaneously or sequentially. The preamplifiers 152 may be of analog-type or digital-type.

The summing unit 162 receives output signals of the preamplifiers 152 and sums the received signals before outputting the received signals. The summing unit 162 may sum analog signals or digital signals.

An output signal of the summing unit 162 may be provided to a controller 164. The controller 164 may convert an analog signal to a digital signal to store data. The controller 164 may control the preamplifier 152, the switch 160, a first carriage 132, and a second carriage 134. The controller 164 may execute operations required for self-absorption mismatch correction and spectral mismatch correction. In addition, the controller 164 may operate output signals of the photometer 114 and the photodetectors 112a~112f to calculate a total luminous flux of the light source to be measured.

Figure 3:
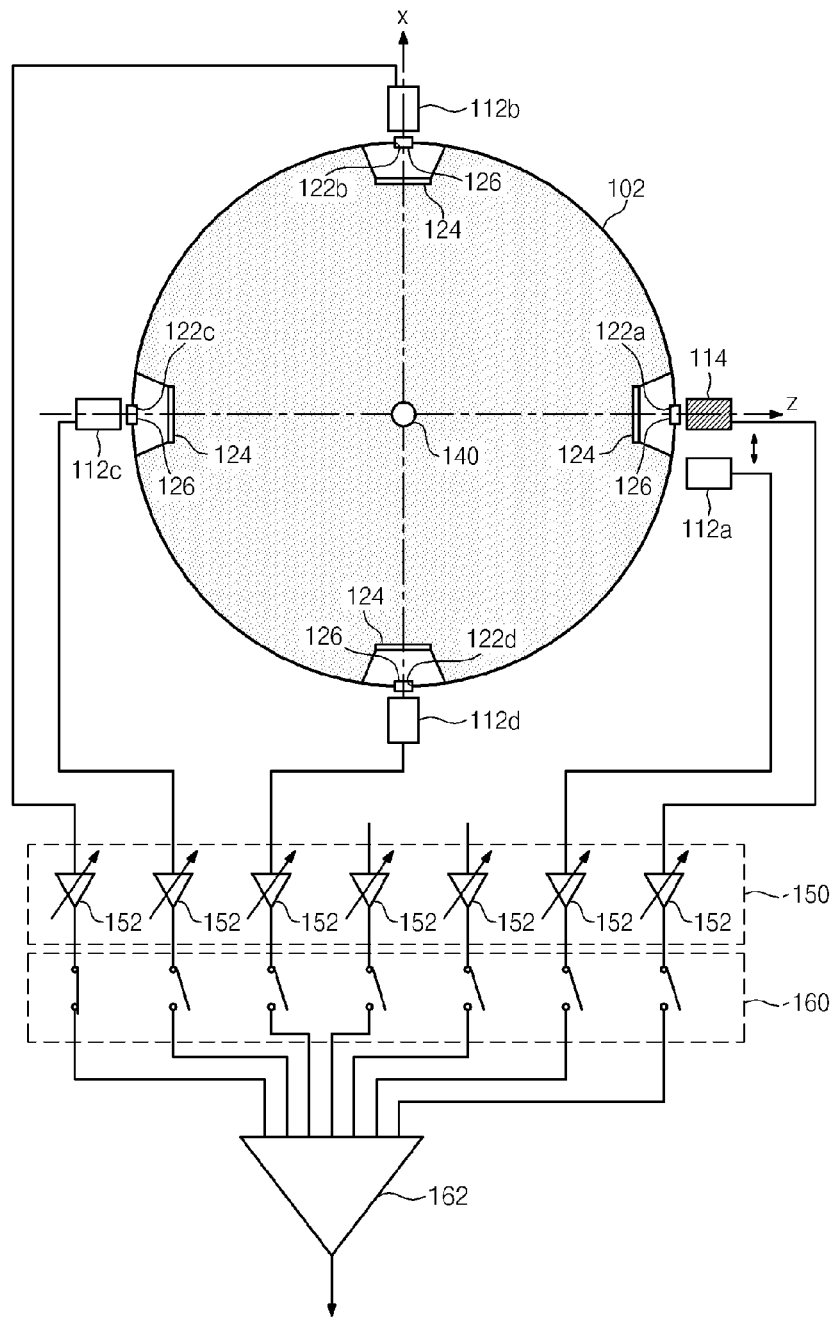
FIG. 3 illustrates gain adjustment of photodetectors and a photometer mounted in an integrating sphere photometer according to the present invention.

Referring to FIG. 3, the photodetectors 112a~112f are adjusted before the total luminous flux of the light source to be measured is measured. More specifically, the photodetectors 112a~112f are disposed around the through-holes 122a~122f. Thereafter, the standard light source 140 of point light source type is mounted at the center region of the integrating sphere 102 and is turned on. In this case, the adjustment unit 150 is adjusted such that the output signals y1~y6 of the photodetectors 112a~112f match each other. For example, gains G1~G6 of the preamplifiers 152 are adjusted.

The outputs of the photodetectors 112a~112f and the output of the photometer 114 are measured at the light source to be measured and the standard light source 140.

Figure 4A:
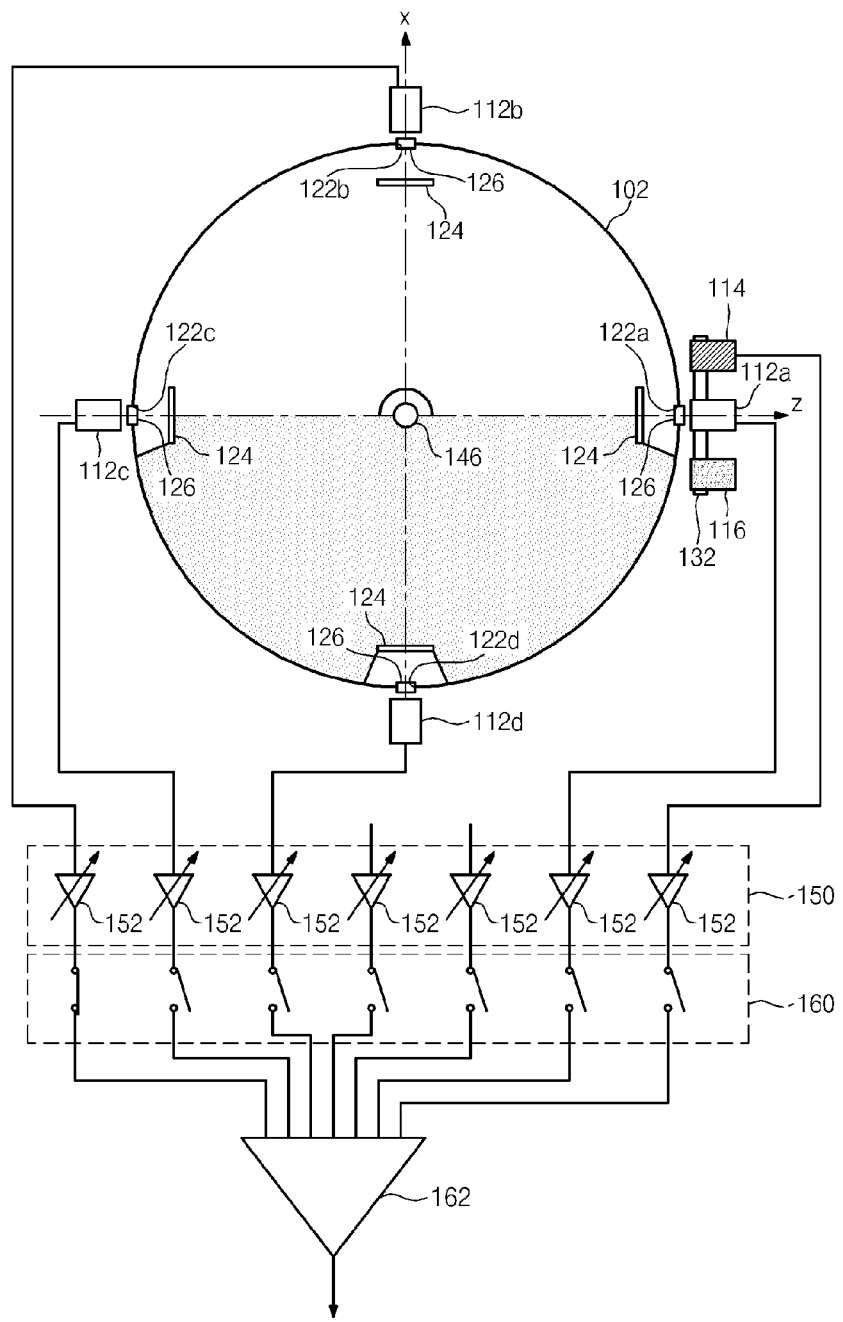
FIGS. 4A to 4D illustrate a measuring method of an integrating sphere photometer according to one embodiment of the present invention.

Referring to FIG. 4A, a first photodetector 112a is mounted at a first through-hole 122a. A light source to be measured is mounted at a center region of an integrating sphere 102, and the light source to be measured is turned on. Outputs $y_{T1}$~$y_{T6}$ of photodetectors are measured while the light source to be measured is turned on.

Figure 4B:
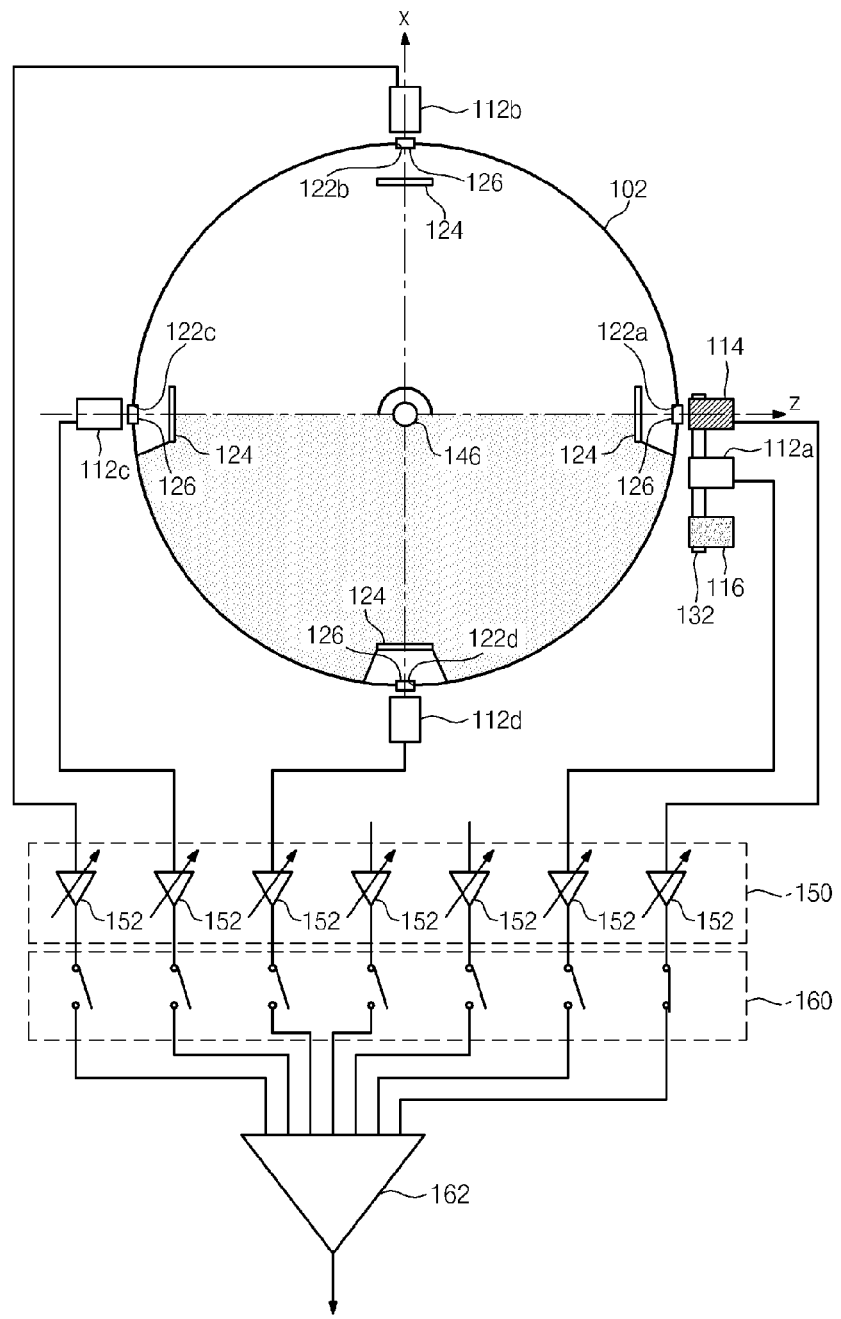

Referring to FIG. 4B, a photometer 114 is mounted around the first through-hole 122a. An output $y^*_T$ of the photometer 114 is measured while the light source to be measured is turned on.

Figure 4C:
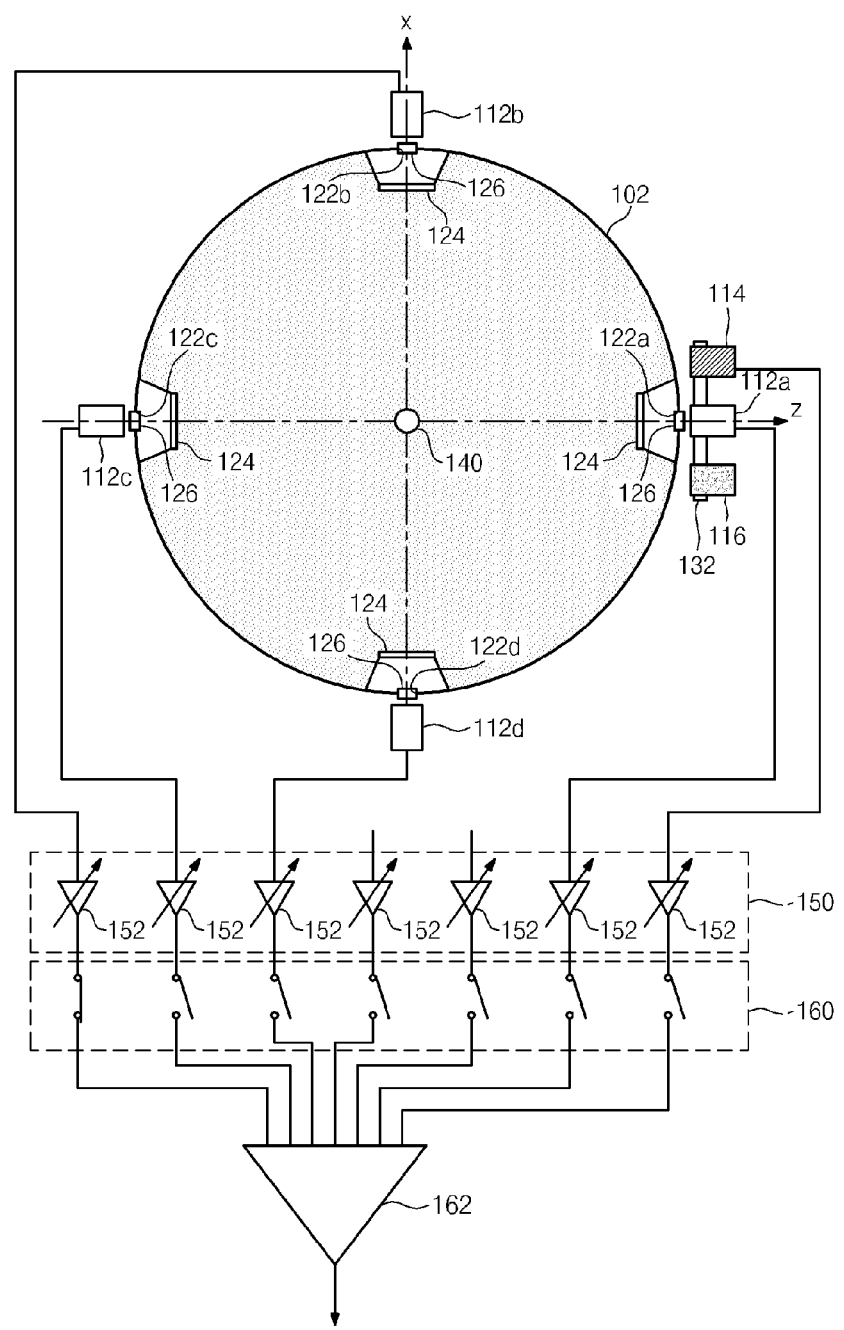

Referring to FIG. 4C, the photometer 114 is removed at the first through-hole 122a, and the first photodetector 112a is mounted at the first through-hole 122a. Thereafter, a standard light source 140 is mounted at the center of the integrating sphere 102 and is turned on. Thereafter, outputs $y_{R1}$~$y_{R6}$ of the photodetectors 112a~112f are measured while the standard light source 140 is turned on.

Figure 4D:
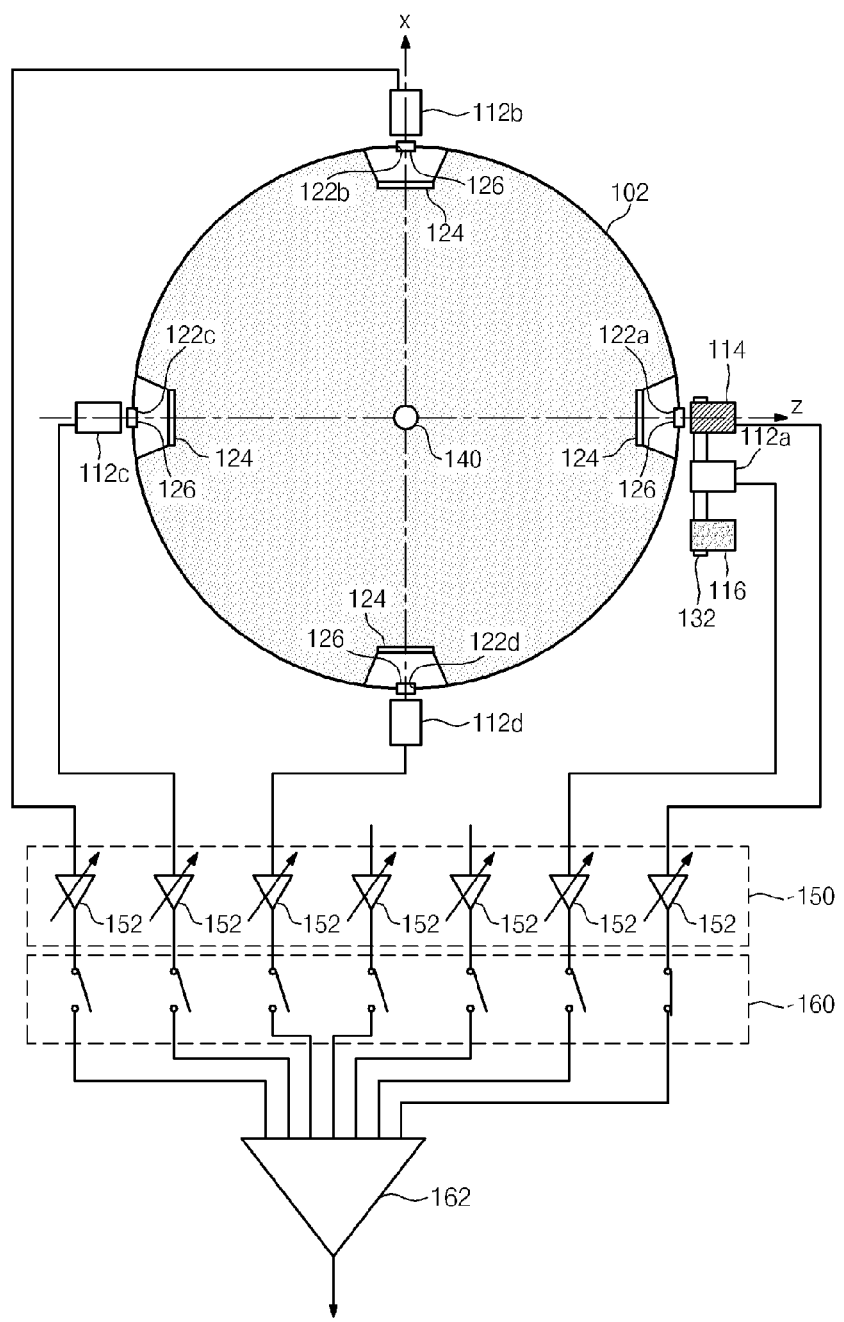

Referring to FIG. 4D, the photometer 114 is mounted around the first through-hole 122a. An output $y^*_R$ of the photometer 114 is measured while the standard light source 140 is turned on.

A total luminous flux $\Phi_T$ of the light source to be measured may be given, as follows:

MathFigure 1

$$\Phi_T = ccf \cdot acf \cdot \frac{\frac{1}{6}\sum_{i=1}^{6} y_{Ti}}{y_{T1}} \cdot \frac{y_{R1}}{\frac{1}{6}\sum_{i=1}^{6} y_{Ri}} \cdot \frac{y^*_T}{y^*_R} \Phi_R \qquad \text{[Math. 1]}$$

wherein $\Phi_R$ represents a total luminous flux value of the standard light source, ccf represents a spectral mismatch correction factor, and acf represents a self-absorption mismatch correction factor. When spectral mismatch correction is not performed, ccf=1.

According to a modified embodiment of the present invention, at least one photometer is further provided around the through-holes. The photometer may be disposed adjacent to a predetermined photodetector.

A spectroradiometer 116 may be disposed around the first through-hole 122a. Alternatively, the spectroradiometer 116 may be disposed a new through-hole (not shown) formed at adjacent of the first through-hole 122a. The spectroradiometer 116 may be disposed at the first through-hole 122a after removing the photometer 114 or the first photodetector 112a which is previously mounted. The spectroradiometer 116 may measure a spectral distribution $S_R(\lambda)$ of a standard light source when the standard light source is disposed at the center of the integrating sphere 102. Additionally, the spectroradiometer 116 may measure a spectral distribution $S_T(\lambda)$ of a light source to be measured when the light source to be measured is disposed at the center of the integrating sphere 102.

The spectral mismatch correction factor (ccf) may be given, as follows:

MathFigure 2

$$ccf \equiv \frac{\int S_R(\lambda)\gamma(\lambda)R(\lambda)d\lambda}{\int S_R(\lambda)V(\lambda)d\lambda} \frac{\int S_T(\lambda)V(\lambda)d\lambda}{\int S_T(\lambda)\gamma(\lambda)R(\lambda)d\lambda} \quad [\text{Math. 2}]$$

wherein $\gamma(\lambda)$ represents spectral throughput of the integrating sphere 102, $R(\lambda)$ represents spectral responsivity of the photometer 114, and $V(\lambda)$ represents CIE 1924 $V(\lambda)$ spectral luminous efficiency function established by the International Commission on Illumination (CIE).

A first carriage 132 may be a uniaxial carriage. A first photodetector 112a, a photometer 114, and a spectroradiometer 116 may be mounted on the first carriage 132. Any one of the first photodetector 112a, the photometer 114 or the spectroradiometer 116 is aligned with the first through-hole 122a.

An auxiliary light source 142 may be disposed around a third through-hole 122c of the integrating sphere 102. The auxiliary light source 142 may be disposed at a position where the third photodetector 112c is removed. The auxiliary light source 132 may include at least one selected from the group consisting of a tungsten halogen lamp, a deuterium arc lamp, a Globar lamp, a helium-neon laser, a laser diode, and a white light emitting diode (LED). The self-absorption mismatch correction factor may be measured using the auxiliary light source 142.

Figure 5A:
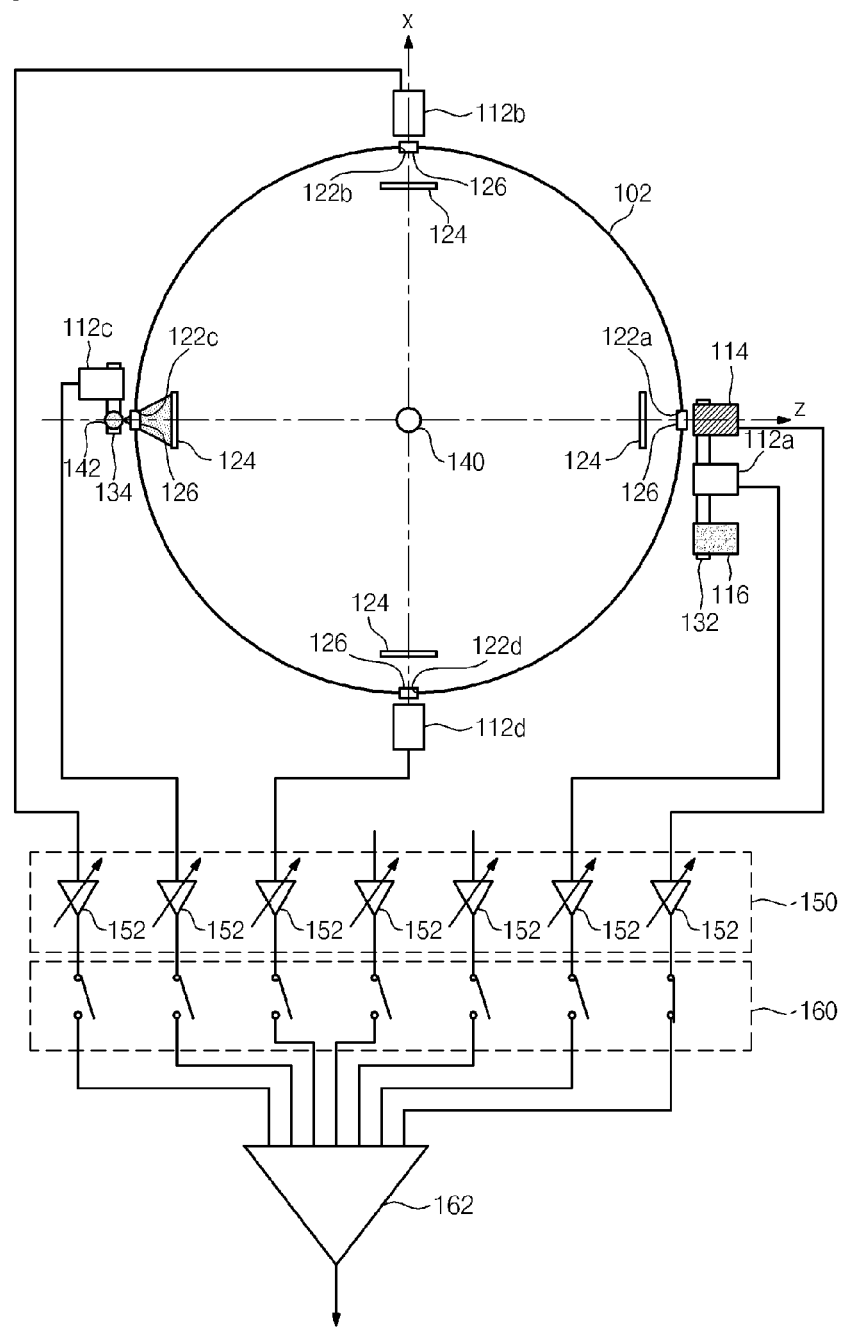
FIGS. 5A and 5B illustrate self-absorption mismatch correction of an integrating sphere photometer according to the present invention.

Referring to FIG. 5A, the auxiliary light source 142 is disposed around the third through-hole 122c and is turned on. The photometer 114 is also disposed at the first through-hole 122a. Thereafter, an output signal $y^*_{RA}$ of the photometer 114 is measured while the standard light source 140 is mounted at the center region of the integrating sphere 102 and is not turned on.

Figure 5B:
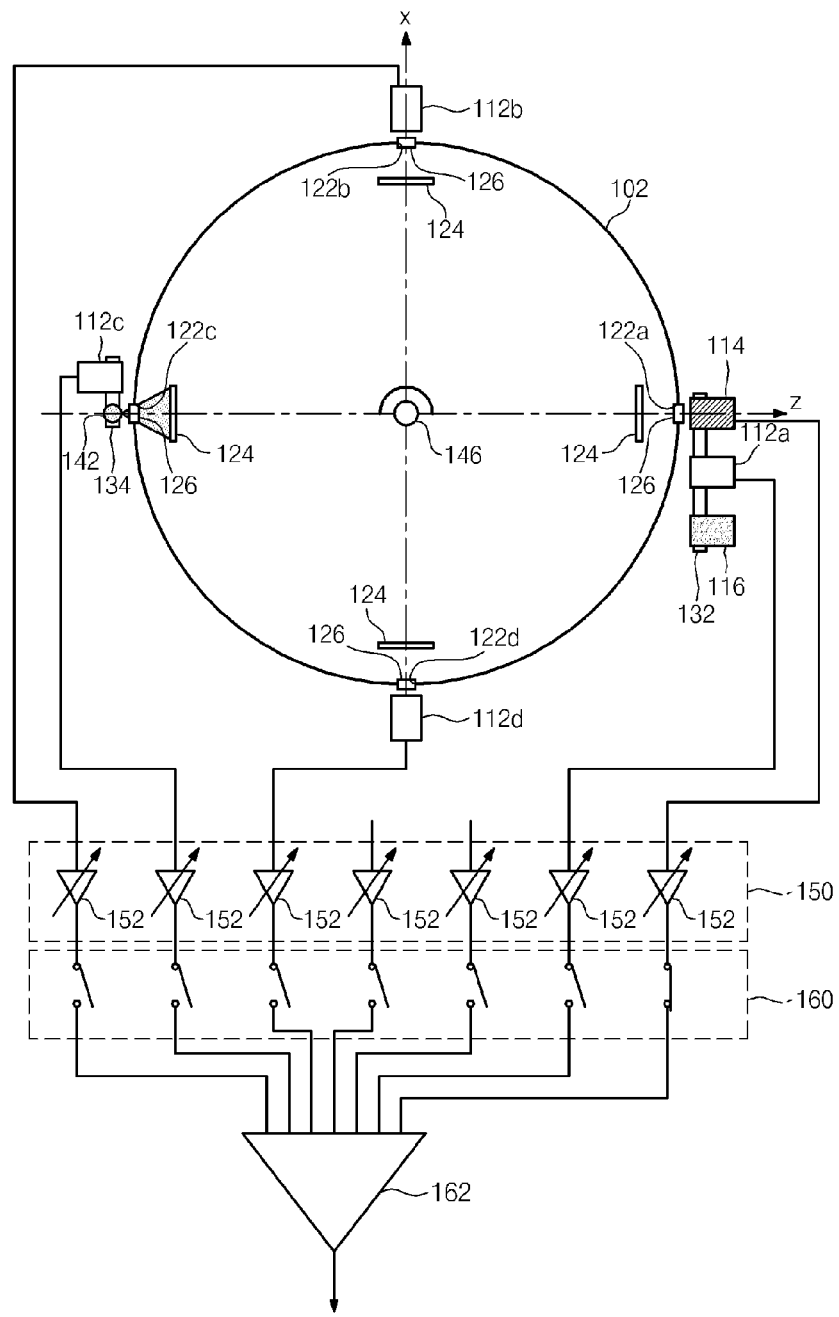

Referring to FIG. 5B, the standard light source 140 is removed. Thereafter, an output signal $y^*_{TA}$ of the photometer 114 is measured while the light source to be measured (146) is mounted at the center region of the integrating sphere 102 and is not turned on.

The self-absorption correction factor (acf) may be given, as follows:

MathFigure 3

$$acf = \frac{y^*_{RA}}{y^*_{TA}} \quad [\text{Math. 3}]$$

The auxiliary light source 142 and the third photodetector 112c may be mounted on the second carriage 134. The second carriage 134 may be a uniaxial carriage. The second carriage 134 may align the auxiliary light source 142 or the third photodetector 112c with the third through-hole 122c.

An integrating sphere photometer according to a modified embodiment of the present invention includes an integrating sphere 102 having a plurality of through-holes 122a~122f, a plurality of photodetectors 112a~112f disposed around the through-holes 122a~122f, baffles 124 disposed inside the integrating sphere 102 to be spaced apart from the photodetectors 112a~112f, and a photometer 114 disposed around a predetermined through-hole 122a. The photometer 114 is disposed at a position where the predetermined photodetector 112a is removed. The integrating sphere photometer further include an adjustment unit 150 adjusting output signals of the photodetectors 122a~122f to have the same output signal with respect to light illuminated from the standard light source 140 of point light source type disposed at the center region in the integrating sphere 102.

The adjustment unit 150 includes preamplifiers 152 configured to amplify output signals of the photometer 114 and the photodetectors 112a~112f. Gains of the preamplifiers 152 are adjusted such that the photodetectors 112a~112f output signals of the same intensity when the standard light source 140 of point light source type is turned on.

The predetermined photodetector 112a, the photometer 114, and a spectroradiometer 116 are mounted on a first carriage 132. The first carriage 132 aligns the photometer 114, the photodetector 112a or the spectroradiometer 116 with the through-hole 122a.

The predetermined photodetector 112c and an auxiliary light source are mounted on the second carriage 134. The second carriage 134 aligns the photodetector 112c or the auxiliary light source 142 with the predetermined through-hole 122c.

An integrating sphere photometer according to another modified embodiment of the present invention includes an integrating sphere 102 having a plurality of through-holes 122a~122f, a plurality of photometers (not shown) disposed around the through-holes 122a~122f, baffles 124 disposed inside the integrating sphere 102 to be spaced apart from the photodetectors 112a~112f, and optical diffusers disposed at the through-holes 122a~122f. The integrating sphere photometer further include an adjustment unit 150 adjusting output signals of the photometers to have the same output signal with respect to light illuminated from the standard light source 140 of point light source type disposed at the center region in the integrating sphere 102. That is, photodetectors described in FIG. 1 are replaced with photometers.

A measuring method of an integrating sphere photometer according to one embodiment of the present invention will now be described below in detail.

Returning to FIGS. 4A to 4D, the measuring method includes a matching step in which baffles are disposed in front of through-holes in an integrating sphere having the through-holes and a point-like standard light source is mounted at the center of the integrating sphere and turned on to match outputs of photodetectors disposed to correspond to the through-holes and a measuring step in which outputs of photodetectors and an output of a photometer are measured in a light source to be measured and the standard light source.

Outputs of the photodetectors disposed to correspond to the through-holes may match each other. For example, baffles are disposed in front of through-holes in an integrating sphere having the through-holes. Photodetectors are disposed to correspond to the through-holes, and a standard lamp is mounted at the center of the integrating sphere and turned on to measure the outputs of the photodetectors. Thereafter, the outputs of the photodetectors are adjusted to be equal to each other.

The outputs of the photodetectors and the output of the photometer are measured in the light source to be measured and the standard light source. For example, a light source to be measured is mounted at a center region of the integrating sphere and turned on. The outputs of the photodetectors are measured while the light source to be measured is turned on. A photometer is mounted around a predetermined through-hole, and an output of the photometer is measured while the light source to be measured is turned on. A standard light source is mounted at the center of the integrating sphere and turned on. Outputs of the photodetectors are measured while the standard light source is turned on. The photometer is mounted around a predetermined through-hole, and an output of the photometer is measured while the standard light source is turned on. A total luminous flux of the light source to be measured is calculated by the Equation 1.

The self-absorption mismatch correction may be done, as follows. An auxiliary light source is mounted inside the integrating sphere or around a predetermined through-hole and turned on. The photometer is mounted around another through-hole. While the auxiliary light source is turned on, a standard lamp is mounted at the center region of the integrating sphere and turned off to measure an output $y^*_{RA}$ of the photometer. While the auxiliary light source is turned on, a light source to be measured is mounted at the center region of the integrating sphere and turned off to measure an output $y^*_{TA}$ of the photometer. A self-absorption mismatch correction factor is calculated by the Equation 3.

The spectral mismatch correction may be done, as follows. The standard light source is mounted at the center region of the integrating sphere and turned on to measure an output signal of a spectroradiometer. The light source to be measured is mounted at the center region of the integrating sphere and turned on to measure an output signal of the spectroradiometer. A spectral mismatch correction factor is calculated by the Equation 2.

According to an integrating sphere photometer described above, spatial response of an integrating sphere is made uniform by a plurality of photodetectors that are symmetrically disposed on a surface of the integrating sphere. In addition, gains of the photodetectors disposed on the surface of the integrating sphere are adjusted to provide the same output signal when a point-like standard light source is turned on. Spatial mismatch correction is done using a plurality of low-cost photodetectors. Thus, although a typical standard light source of point light source type is used, a spatial mismatch error is efficiently removed even when a directional light source is measured.

Although the present invention has been described in connection with the embodiment of the present invention illustrated in the accompanying drawings, it is not limited thereto. It will be apparent to those skilled in the art that various substitutions, modifications and changes may be made without departing from the scope and spirit of the present invention.

The invention claimed is:

1. An integrating sphere photometer comprising:
   a plurality of photodetectors;
   an integrating sphere having through-holes formed to correspond to the photodetectors;
   baffles disposed inside the integrating sphere in front of the photodetectors to be spaced apart from the photodetectors;
   a photometer disposed at a through-hole;
   a point-like standard light source disposed at a center region in the integrating sphere, the standard light source is removable from the center region;
   an adjustment unit adjusting output signals of the photodetectors to have the same output signal with respect to light illuminated from the standard light source when the standard light source is turned on, wherein the adjustment unit comprises preamplifiers configured to amplify output signals of the photodetectors and the photometer wherein gains of the preamplifiers are adjusted such that outputs of the photodetectors match each other while the standard light source is turned on;
   a directional light source to be measured, wherein the direction light source is mounted at the center region in the integrating sphere when the standard light source is removed; and
   a summing unit configured to sum the output signals of the preamplifiers and output the summed signals.

2. The integrating sphere photometer as set forth in claim 1, wherein the photometer is mounted after the photodetector is removed or is disposed adjacent to a predetermined photodetector.

3. The integrating sphere photometer as set forth in claim 1, further comprising:
   a switch unit configured to selectively provide outputs of the preamplifiers to an input of the summing unit.

4. The integrating sphere photometer as set forth in claim 1, further comprising a first carriage for adjusting positions of the photodetectors to control an input signal.

5. The integrating sphere photometer as set forth in claim 1, further comprising:
   optical diffusers disposed at the through-holes.

6. The integrating sphere photometer as set forth in claim 1, further comprising:
   an auxiliary light source disposed around the through-hole or mounted at a position where a predetermined photodetector is removed.

7. The integrating sphere photometer as set forth in claim 1, further comprising:
   an auxiliary light source mounted inside the integrating sphere; and
   an auxiliary baffle disposed around the auxiliary light source, wherein the auxiliary baffle prevents output light of the auxiliary light source from being directly illuminated to the photodetectors.

8. The integrating sphere photometer as set forth in claim 1, further comprising:
   a spectroradiometer disposed around the through-hole or mounted at a position where a predetermined photodetector is removed.

9. An integrating sphere photometer comprising:
   an integrating sphere having a plurality of through-holes;
   a plurality of photodetectors disposed around the through-holes;
   baffles disposed inside the integrating sphere to be spaced apart from the photodetectors;
   a photometer disposed around a predetermined through-hole, the photometer being disposed at a position where a predetermined photodetector is removed;
   a point-like standard light source disposed at a center region in the integrating sphere, the standard light source is removable from the center region
   an adjustment unit adjusting output signals of the photodetectors to have the same output signal with respect to light illuminated from the standard light source when the standard light source is turned on, wherein the adjustment unit comprises preamplifiers configured to output signals of the photometer and the photodetectors, wherein gains of the preamplifiers are adjusted such that outputs of the photodetectors match each other when the standard light source is turned on; and a directional light source to be measured, wherein the direction light source is mounted at the center region in the integrating sphere while the standard light source is removed.

10. The integrating sphere photometer as set forth in claim 9, further comprising:

a spectroradiometer; and a first carriage on which the predetermined photodetector, the photometer, and the spectroradiometer are mounted, wherein the first carriage aligns the photometer, the photodetector or the spectroradiometer with a through-hole.

11. The integrating sphere photometer as set forth in claim 9, further comprising:

an auxiliary light source; and a second carriage on which the predetermined photodetector and the auxiliary light source are mounted, wherein the second carriage aligns the photodetector or the auxiliary light source with the through-hole.

12. An integrating sphere photometer comprising:

an integrating sphere having a plurality of through-holes;

a plurality of photometers disposed around the through-holes;

baffles disposed inside the integrating sphere to be spaced apart from the photometers;

optical diffusers disposed at the through-hole;

an adjustment unit adjusting output signals of the photometers to have the same output signal with respect to light illuminated from a point-like standard light source disposed at a center region in the integrating sphere, wherein the adjustment unit comprises preamplifiers configured to amplify output signals of the photometer;

a summing unit configured to sum the output signals of the preamplifiers and output the summed signals; and a switch unit configured to selectively provide outputs of the preamplifiers to an input of the summing unit.

13. A measuring method of an integrating sphere photometer, comprising:

a matching step in which baffles are disposed in front of a plurality of through-holes in an integrating sphere having the plurality of through-holes and a point-like standard light source is mounted at a center in the integrating sphere and turned on to match outputs of a plurality of photodetectors disposed to correspond to the through-holes; and a measuring step in which outputs of photodetectors and an output of a photometer are measured in a directional light source to be measured and the standard light source, wherein the directional light source is mounted at the center in the integrating sphere when the standard light source is removed, wherein the matching step comprises i) amplifying output signals of the photodetectors and the photometer using preamplifiers, ii) summing the output signals of the preamplifiers, and iii) outputting the summed signals, wherein gains of the preamplifiers are adjusted such that outputs of the photodetectors match each other while the standard light source is turned on.

14. The measuring method as set forth in claim 13, wherein the matching step comprises:

disposing baffles in front of through-holes in the integrating sphere having the through-holes; and disposing photodetectors correspond to the through-holes, and disposing a point-like standard light source at the center of the integrating sphere and turning on the standard light source to measure outputs of the photodetectors and adjust the outputs of the photodetectors to be equalized.

15. The measuring method as set forth in claim 13, wherein the measuring step comprises:

mounting a light source to be measured at a center region of the integrating sphere and turning on the light source to be measured;

measuring outputs of the photodetectors while the light source to be measured is turned on; mounting a photometer around a predetermined through-hole and measuring an output of the photometer while the light source to be measured is turned on; mounting a standard light source at the center of the integrating sphere and turning on the standard light source; measuring outputs of the photodetectors while the standard light source is turned on; and mounting the photometer around a predetermined through-hole and measuring an output of the photometer while the standard light source is turned on.

16. The measuring method as set forth in claim 13, further comprising:

a self-absorption mismatch correction step, wherein the self-absorption mismatch correction step comprises:

mounting an auxiliary light source inside the integrating sphere or around a predetermined through-hole and turning on the auxiliary light source;

mounting the photometer around another through-hole;

mounting a standard lamp at a center region of the integrating sphere and measuring an output ($y^*_{RA}$) of the photometer while the auxiliary light source is turned on and the standard lamp is not turned on; and mounting a light source to be measured at the center region of the integrating sphere and measuring an output ($y^*_{TA}$) of the photometer while the auxiliary light source is turned on and the light source to be measured is not turned on.

17. The measuring method as set forth in claim 13, further comprising:

a spectral mismatch correction step, wherein the spectral mismatch correction step comprises: mounting the standard light source at a center region of the integrating sphere and turning on the standard light source to measure an output of the spectroradiometer; and mounting the light source to be measured at the center region of the integrating sphere and turning on the light source to be measured to measure an output of the spectroradiometer.

* * * * *